US007596365B2

(12) United States Patent
Ferchland et al.

(10) Patent No.: US 7,596,365 B2
(45) Date of Patent: Sep. 29, 2009

(54) DEVICE FOR TRANSMITTING AND RECEIVING

(75) Inventors: Tilo Ferchland, Dresden (DE); Menno Mennenga, Dresden (DE); Frank Poegel, Dresden (DE); Attila Roemer, Dresden (DE)

(73) Assignee: ATMEL Germany GmbH, Heilbronn (DE)

( * ) Notice: Subject to any disclaimer, the term of this patent is extended or adjusted under 35 U.S.C. 154(b) by 337 days.

(21) Appl. No.: 11/583,009

(22) Filed: Oct. 19, 2006

(65) Prior Publication Data

US 2007/0086532 A1 Apr. 19, 2007

(30) Foreign Application Priority Data

Oct. 19, 2005 (DE) .................. 10 2005 049 931

(51) Int. Cl.
*H04B 1/16* (2006.01)

(52) U.S. Cl. .................. 455/343.1; 370/311; 455/257; 455/446

(58) Field of Classification Search .................. 370/342, 370/310, 428, 354, 5, 338, 311; 455/557, 455/558; 710/38; 714/748
See application file for complete search history.

(56) References Cited

U.S. PATENT DOCUMENTS

| 5,560,021 | A | | 9/1996 | Vook et al. | |
|---|---|---|---|---|---|
| 5,655,102 | A | * | 8/1997 | Galles | 711/150 |
| 6,115,831 | A | * | 9/2000 | Hanf et al. | 714/43 |
| 2004/0199645 | A1 | * | 10/2004 | Rouhi | 709/227 |
| 2005/0287957 | A1 | * | 12/2005 | Lee et al. | 455/68 |

(Continued)

FOREIGN PATENT DOCUMENTS

EP 1 647 889 A1 4/2006

(Continued)

OTHER PUBLICATIONS

Khanh Tuan Le, Next Generation Wireless, "Designing a ZigBee-ready IEEE 802.15.4-compliant radio transceiver," RFDESIGN, Nov. 2004, pp. 42-50.

*Primary Examiner*—Vincent P Harper
*Assistant Examiner*—Mahendra R Patel
(74) *Attorney, Agent, or Firm*—Muncy, Geissler, Olds & Lowe, PLLC

(57) ABSTRACT

A device for transmitting and receiving is disclosed that includes: a) an antenna, b) a transmitting/receiving unit for transmitting and receiving data according to a communications standard, which has a transmitting unit, connected to the antenna, for transmitting first data frames to a second transmitting/receiving device and a receiving unit, connected to the antenna, for receiving second data frames from the second transmitting/receiving device, and c) a control unit, connected to the transmitting/receiving unit for controlling the transmitting/receiving unit, whereby the control unit is designed (c1) to instruct the transmitting/receiving unit to transmit a first data frame and (c2) to receive the second data frame from the transmitting/receiving unit. According to the invention, the transmitting/receiving unit has a controller, which is connected to the receiving unit and the control unit and is designed d) to evaluate a second data frame, received by the receiving unit within a predefined time interval after the transmission of the first data frame, and to determine whether the second data frame contains an acknowledgment message for the successful receipt of the first data frame by the second transmitting/receiving device, and e) not to relay the second data frame to the control unit, if it is determined that it contains the acknowledgment message.

20 Claims, 4 Drawing Sheets

U.S. PATENT DOCUMENTS

| | | | |
|---|---|---|---|
| 2006/0056421 A1* | 3/2006 | Zaki | 370/400 |
| 2006/0092871 A1* | 5/2006 | Nishibayashi et al. | 370/328 |
| 2007/0067300 A1* | 3/2007 | Ollis et al. | 707/10 |
| 2007/0147334 A1* | 6/2007 | Guthrie | 370/349 |
| 2007/0183457 A1* | 8/2007 | Leitch | 370/498 |

FOREIGN PATENT DOCUMENTS

| | | |
|---|---|---|
| WO | WO 2005/010214 A2 | 2/2005 |
| WO | WO 2005/062644 A1 | 7/2005 |
| WO | WO 2005/086428 A1 | 9/2005 |

\* cited by examiner

DEVICE FOR TRANSMITTING AND RECEIVING

This nonprovisional application claims priority under 35 U.S.C. § 119(a) on German Patent Application No. DE 102005049931, which was filed in Germany on Oct. 19, 2005, and which is herein incorporated by reference.

BACKGROUND OF THE INVENTION

1. Field of the Invention

The present invention relates to a device for transmitting and receiving.

The invention falls within the field of data transmission. Although it can be used in principle in any digital communication system for bidirectional data transmission, the present invention and its underlying problem will be explained below with reference to a "ZigBee" communication system in accordance with IEEE 802.15.4.

2. Description of the Background Art

So-called "Wireless Personal Area Networks" (WPANs) can be used for the wireless transmission of information over relatively short distances (about 10 m). In contrast to "Wireless Local Area Networks" (WLANs), WPANs require little or even no infrastructure for data transmission, so that small, simple, power-efficient, and cost-effective devices can be implemented for a broad range of applications.

The standard IEEE 802.15.4 specifies low-rate WPANs, which are suitable with raw data rates up to 250 kbits/s and stationary or mobile devices for applications in industrial monitoring and control, in sensor networks, in automation, in the field of computer peripherals, and for interactive games. In addition to a very simple and cost-effective implementability of the devices, an extremely low power requirement of the device is of critical importance for such applications. Thus, an objective of this standard is a battery life of several months to several years.

Known transmitting/receiving devices comprise a transmitting/receiving unit for transmitting and receiving data according to a communication standard and a control unit for controlling the transmitting/receiving unit, so that the power requirement of the entire transmitting/receiving device results from that of the transmitting/receiving unit plus that of the control unit.

Typically, the transmitting/receiving unit senses the functionalities specified at the level of the physical layer (PHY) of the communication standard, whereas the control unit assumes those of the MAC layer and optionally higher layers. The PHY functionalities hereby include, for example, the transmitting and receiving of PHY data frames (PPDU) over the physical channel (modulation/demodulation, synchronization, etc.) and the checking of channel occupation (clear channel assessment, CCA). Methods for increasing the robustness of the data transmission, such as, e.g., the acknowledgment of successfully received PHY data frames by acknowledgement frames (ACK), the further procedure in abortive transmission attempts, or anti-collision methods such as CSMA-CA (carrier sense multiple access with collision avoidance), in contrast, are specified at the MAC level.

Due to the resulting temporary activities and different operating modes with a different operating power requirement, the power requirement of the transmitting/receiving unit and/or the control unit is not constant over time but varies considerably. It is a disadvantage hereby that in some of the time segments, in which, e.g., the transmitting/receiving unit has an increased power requirement, the control unit also requires a large amount of operating power. Conversely, it cannot be ruled out that the transmitting/receiving unit requires a large amount of power, when the control unit also has an increased demand. The entire transmitting/receiving device therefore has a power requirement with high peak values (peaks). The peak currents resulting from this increase not only the average power requirement of the transmitting/receiving device, but disadvantageously may require larger dimensioning of the power supply unit (battery).

SUMMARY OF THE INVENTION

It is therefore an object of the present invention to provide a simple device for transmitting and receiving, which is cost-effective in its implementation and saves power during operation and which in particular has a low peak current consumption.

In an embodiment, the device includes an antenna, a transmitting/receiving unit for transmitting and receiving data according to a communication standard, which has a transmitting unit, connected to the antenna, for transmitting first data frames to a second transmitting/receiving device and a receiving unit, connected to the antenna, for receiving second data frames from the second transmitting/receiving device, and a control unit, connected to the transmitting/receiving unit, for controlling the transmitting/receiving unit, whereby the control unit is designed to instruct the transmitting/receiving unit to transmit a first data frame and to receive the second data frame from the transmitting/receiving unit. The transmitting/receiving unit hereby has a controller, which is connected to the receiving unit and the control unit and is designed to evaluate a second data frame received by the receiving unit within a predefined time interval after the transmission of the first data frame and to determine whether the second data frame contains an acknowledgment message for the successful receipt of the first data frame by the second transmitting/receiving device, and not to relay the second data frame to the control unit, if it is determined that it contains the acknowledgment message.

An object of the invention is the evaluation of the second data frame, received by the second transmitting/receiving device, by the controller of the transmitting/receiving unit, in order to check whether it contains the acknowledgment message, and if this applies, not to relay the second data frame to the control unit. It is advantageously achieved by this suppression of the receipt acknowledgment frame even in the transmitting/receiving unit that the control unit need not be kept in an active operating state with a relatively high power consumption in order to receive and evaluate the receipt acknowledgment frame and to respond to it accordingly. It is made possible in this way to decouple the time segments in which the transmitting/receiving unit has a relatively high power demand from the time segments in which the control unit requires a relatively high amount of operating power in such a way that they do not overlap in time, so that the total peak power demand of the transmitting/receiving device declines. Overall, the battery life of the transmitting/receiving device increases by up to a third.

In an embodiment, the control unit can have at least two operating modes ("sleep," "active," or the like) with a different high power consumption and is designed to shift to a power-saving mode with a low power consumption as soon as it has instructed the transmitting/receiving unit to transmit the first data frame. The control unit can be designed to again exit the power-saving mode when it receives an interrupt from the controller. The earliest possible entry into the power-saving mode and/or the latest possible exiting from the same have the result that the time interval in which the control unit is in the power-saving mode is prolonged. On the one hand, this reduces the power requirement necessary for operating the control unit (and thereby also the transmitting/receiving device overall) and, on the other, also lowers the total peak current demand, because the likelihood of the peak current demand of the transmitting/receiving unit coinciding in time with a peak current demand of the control unit is reduced.

According to a further embodiment, before the transmission of the first data frame, the controller instructs the receiving unit to check whether the transmission channel specified for the transmission of the first data frame is busy. If this check indicates that the specified transmission channel is not busy, i.e., is free (and only in this case), the controller instructs the transmitting unit to transmit the first data frame. By this means, both the checking of the channel occupation itself and the request for a check, evaluation of the checking result, and the request for transmitting the first data frame in the case of a free transmission channel occur within the transmitting/receiving unit and thereby independent of the control unit. At least in the case of a free channel, thereby to assure the CSMA-CA/CCA functionalities (carrier sense multiple access with collision avoidance, clear channel assessment), no interaction is necessary between the transmitting/receiving unit and the control unit. So that the transmitting/receiving unit assumes the CSMA-CA/CCA functionalities autonomously, the control unit need not be kept either in an active operating state with a relatively high power consumption in order to issue CSMA-CA instructions to check the channel occupation or to evaluate the CCA results, and, if necessary, to issue transmission instructions, nor does it need to exit a power-saving mode in order to perform such activities. By this means, the power requirement necessary to operate the control unit (and thereby also the transmitting/receiving device overall) is reduced, but the total peak current demand is also lowered.

In another embodiment, the controller informs the control unit, for example, by an interrupt, if no second data frame is received within the predefined time interval or if it is determined that the second data frame does not contain the acknowledgment message. In these cases, a successful receipt of the first data frame by the second transmitting/receiving device cannot be assumed. The control unit can shift from the power-saving mode to an active mode due to the interrupt, in order to initiate further measures, such as, e.g., a retransmission of the first data frame.

According to a further embodiment, the controller can be connected in addition to the transmitting unit and has a memory. The controller stores the first data frame in the memory in regard to the first transmission, and independently (autonomously), i.e., without instruction by the control unit, prompts the transmitting unit to retransmit the first data frame to the second transmitting/receiving device, if no second data frame is received within the predefined time interval or if it is determined that the second data frame does not contain the acknowledgment message. As a result, the first data frame is retransmitted autonomously by the transmitting/receiving unit in those cases in which its successful receipt cannot be assumed. The control unit can remain longer in a power-saving mode also in the case of unsuccessful transmission attempts by means of this measure, so that the power requirement and the total peak current consumption by the transmitting/receiving unit and control unit decline.

In an embodiment, the controller informs the control unit, for example, by an interrupt only when after a predefined number of independent prompts to retransmit the first data frame to the second transmitting/receiving device, no second data frame, which contains the acknowledgment message, was received within the predefined time interval after the specific retransmission. This results in a declining power demand and a reduced total peak current consumption.

According to a further embodiment, the controller first evaluates the first data frame and determines whether in the case of its successful receipt by the second transmitting/receiving device the acknowledgment message is even expected. If the acknowledgment message is expected, and only then, the controller also evaluates the second data frame and determines whether it in fact contains the acknowledgment message. If the acknowledgment message is expected and if it is determined that the second data frame contains the acknowledgment message, and only in this case, the controller does not relay the second data frame to the control unit. Because the first data frame is also evaluated and, e.g., it is checked using one of its data fields whether an acknowledgment message is expected for its successful receipt, the evaluation of the second data frame when no acknowledgment message is expected can be advantageously omitted. This lowers further the power consumption of the transmitting/receiving unit.

The notification of the control unit in the case of an absent acknowledgment message or absent second data frame after the first or repeated transmission of the first data frame and the autonomous retransmission of the first data frame by the transmitting/receiving unit can be omitted, when no acknowledgment message is expected, because this lowers the power consumption of the transmitting/receiving unit.

In a further embodiment, the controller, before the retransmission of the first data frame, instructs the receiving unit to check whether the transmission channel specified for the retransmission of the first data frame is busy. Only when the specified transmission channel is not busy (thus free), does the controller instruct the transmitting unit to retransmit the first data frame. The channel occupation check also before the retransmission of the first data frame by the transmitting/receiving unit further lowers the power requirement necessary for operating the control unit (and thereby also of the transmitting/receiving device overall) but also the total peak current requirement.

In another embodiment, the controller is designed a) if the check has shown that the specified transmission channel is busy, to instruct the receiving unit at a later time to check whether the specified transmission channel is busy, b) to instruct the transmitting unit to transmit the first data frame only when the repeated check has shown that the specified transmission channel is not busy, and c) to inform the control unit, for example, by an interrupt only when a predefined number of checks has each shown that the specified transmission channel is busy. Because the control unit is informed only after a specified number of checks and determinations that the channel is busy, the power requirement necessary for operating the control unit (and thereby also the transmitting/receiving device overall) but also the total peak current requirement are further lowered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
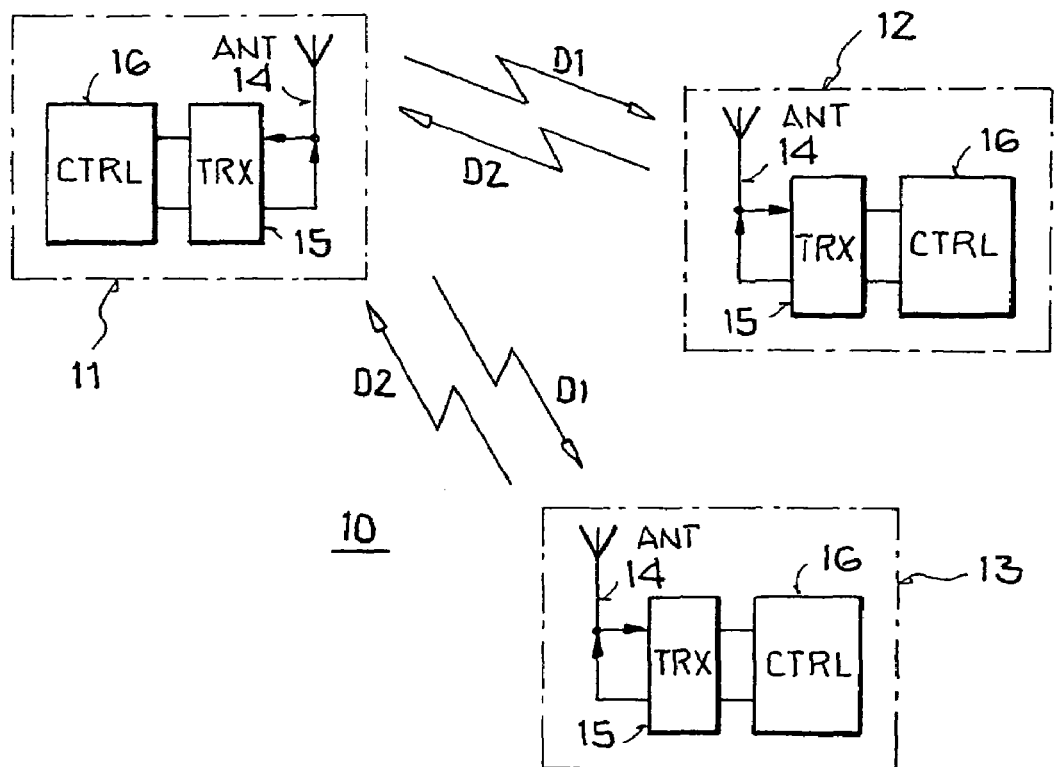
FIG. 1 illustrates an example of a "Wireless Personal Area Network" (WPAN) according to IEEE 802.15.4 with the transmitting/receiving devices according to an embodiment of the invention.

In the figures, the same and functionally identical elements and signals, if not specified otherwise, are provided with the same reference characters.

FIG. 1 shows an example of a WPAN data transmission system 10 according to the communication standard IEEE 802.15.4. It comprises three transmitting/receiving devices 11-13 in the form of stationary or mobile devices, which exchange information in a wireless manner by radio signals. The transmitting/receiving device 11 is a full-function device, which takes on the function of the WPAN coordinator, whereas transmitting/receiving devices 12, 13 are reduced-function devices, which are assigned to the full-function device 11 and can only exchange data with said device. Apart from the star network topology depicted in FIG. 1, in which bidirectional data transmission can only occur between one of the reduced-function devices 12, 13 and the full-function device 11, but not between the reduced function devices 12, 13, the standard also provides so-called "peer-to-peer" topologies, in which all full-function devices can communicate with all other full-function devices.

Transmitting/receiving devices 11-13 each comprise an antenna 14, a transmitting/receiving unit (transceiver, TRX) 15, connected to the antenna, for transmitting and receiving data according to IEEE 802.15.4, and a control unit (control unit, CTRL) 16, connected to the transmitting/receiving unit, to control the transmitting/receiving unit 15 according to IEEE 802.15.4. Furthermore, transmitting/receiving devices 11-13 each contain a power supply unit, not shown in FIG. 1, in the form of a battery, etc., to supply power to units 15, 16, and possibly other components (sensors, actuators, etc.).

The control unit 16, for example, of the transmitting/receiving device 11 is designed to instruct the transmitting/receiving unit 15 of "its" transmitting/receiving device (11) to transmit a first data frame D1 to a second transmitting/receiving device 12 or 13. In response to such an instruction, transmitting/receiving unit 15 of transmitting/receiving device 11 transmits the first data frame D1 to the second transmitting/receiving device 12 or 13.

If second transmitting/receiving device 12 or 13 transmits a second data frame D2 to first transmitting/receiving device 11, thus the second data frame D2 is received by transmitting/receiving unit 15 of transmitting/receiving device 11 and optionally relayed to control unit 16 of transmitting/receiving device 11 and evaluated by the unit.

Apart from the functions specified at the level of the physical layer (PHY), transmitting/receiving unit 15 senses some of the functions, described in greater detail below, which are specified at the level of the MAC layer (medium access control layer) of the communication standard (here: IEEE 802.15.4). Control unit 16, in contrast, is entrusted "only" with the remaining functions of the MAC layer and optionally with functions of higher layers.

Transmitting/receiving unit 15 is hereby always a part of an integrated circuit (not shown in FIG. 1), e.g., an ASIC (application specific integrated circuit) or an ASSP (application specific standard product), whereas control unit 16 is realized in each case by a microcontroller (also not shown). Advantageously, each transmitting/receiving device has one integrated circuit (e.g., made as ASIC or ASSP), which senses the functions of its transmitting/receiving unit 15 and its control unit 16.

Figure 2:
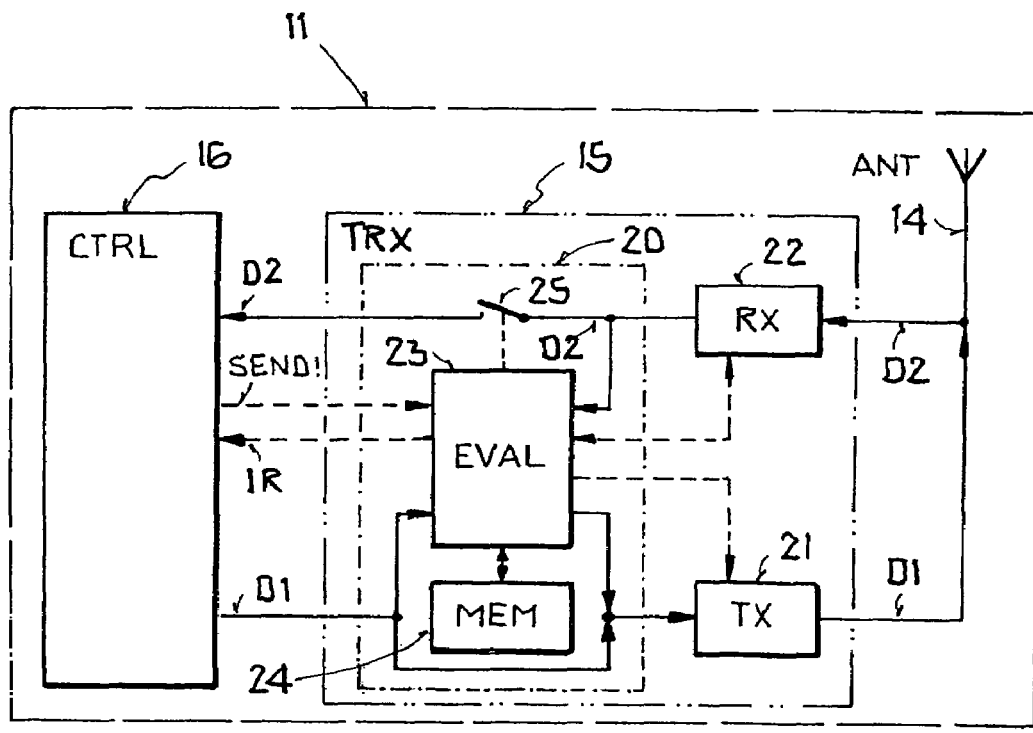
FIG. 2 illustrates an embodiment of the transmitting/receiving device of the invention.

FIG. 2 shows a block diagram of a transmitting/receiving device 11 of the invention. The reference symbols 14-16 again designate the antenna (ANT), the transmitting/receiving unit (TRX), or the control unit (CTRL).

Transmitting/receiving unit 15 comprises a transmitting unit (transmitter, TX) 21, connected to antenna 14, for transmitting first data frames D1 to a second transmitting/receiving device 12, 13 (see FIG. 1), a receiving unit (receiver, RX) 22, also connected to antenna 14, for receiving second data frames D2 from second transmitting/receiving device 12, 13, and a controller 20, connected to transmitting unit 21, receiving unit 22, and control unit 16.

Transmitting unit (TX) 21 converts the data stream to be transmitted according to IEEE 802.15.4 into a radio signal to be emitted via antenna 14. If the transmission, e.g., is to occur in the ISM frequency band at 2.4 GHz, the data stream (raw data rate: 250 kbits/s) to be transmitted is first converted into four-bit wide symbols (symbol rate: 62.5 ksymbol/s) and these into successive symbol value specific PN sequences (pseudo noise) of 32 chips in each case (chip rate: 2 Mchip/s). The successive PN sequences are then offset-QPSK-modulated (quadrature phase shift keying), spectrally shifted into one of 16 channels in the ISM frequency band, and finally amplified for the transmission. Transmitting unit 21 therefore senses the functions specified at the level of the physical layer (PHY). The first data frame D1 to be transmitted hereby changes from a MAC frame (MAC protocol data unit, MPDU) into a longer PHY frame (physical protocol data unit, PPDU), because, e.g., a synchronization header is prefixed, to enable receiver-side synchronization to the data stream.

Receiving unit (RX) 22 transforms a radio signal received by antenna 14 and generated by the transmitting unit of the second transmitting/receiving device 12, 13 (FIG. 1) according to IEEE 802.15.4 as error-free as possible according to the specifications in this standard into transmitted data, in that the received radio signal is, inter alia, filtered, transformed into the baseband, and demodulated, and the data are detected (decided). Receiving unit 22 also senses the functions specified at the PHY level. The received second data frame D2 hereby shifts from a PHY frame (PPDU) to a shorter MAC frame (MPDU), because, e.g., there is no synchronization header.

Controller 20 is designed to receive from control unit 16, e.g., by a command and/or by transmission of the first data frame D1 an instruction to transmit D1 to second transmitting/receiving device 12 or 13. It is designed furthermore to transmit the first data frame D1 in the form of a MAC frame to transmitting unit 21 and to order this unit to transmit D1. In FIG. 2, this is shown by the arrow labeled "Send!" or "D1"

between control unit 16 and controller 20 and by the arrow between controller 20 and transmitting unit 21.

Controller 20 is designed moreover to receive the second data frame D2 from receiving unit 22 in form of MAC frames and optionally to relay this to control unit 16. In FIG. 2, this is shown by the arrow between controller 20 and receiving unit 22 and by the arrow labeled "D2" between controller 20 and control unit 16.

The transmitting/receiving unit 15 assumes the functionalities, specified at the MAC level, of evaluating the received second data frame D2 after transmission of a first data frame D1. For this purpose, controller 20 evaluates a second data frame D2, received by receiving unit 22 within a predefined time interval T1 after the transmission of the first data frame D1, and checks whether D2 contains an acknowledgment message (ACK) for the successful receipt of D1 by the second transmitting/receiving device 12. If it is determined that D2 contains the acknowledgment message (ACK), controller 20 does not relay the second data frame D2 to control unit 16. This makes it possible to shift control unit 16, which has at least two operating modes with a different level of power consumption to lower the power consumption, to a power-saving mode ("sleep mode") with a low power consumption at the earliest possible time, namely, as soon as it has instructed transmitting/receiving unit 15 to transmit the first data frame D1. This assures that control unit 16 is in the power-saving mode, when transmitting/receiving unit 15 requires a relatively high amount of power for transmitting D1. As a result, the peak current consumption of the entire transmitting/receiving device 11 declines. Control unit 16 first assumes that the data frame D1 will be successfully received by second transmitting/receiving device 12.

The predefined time interval T1 has a duration between 150 μs and 500 μs, preferably between 300 μs and 400 μs. Typically it is about 350 μs.

To evaluate D2, controller 20 has an evaluation unit (EVAL) 23 connected to receiving unit 22. If the evaluation indicates that D2 contains the acknowledgment message (ACK), evaluation unit 23 suppresses the relaying of D2 to control unit 16. This is shown symbolically in FIG. 2 by a switching element 25, which is accordingly controlled by evaluation unit 23, thus opened and otherwise closed in the indicated case. In this case, control unit 16 remains in the power-saving mode. To determine the start of the time interval T1, evaluation unit 23 is preferably connected to control unit 16 and/or transmitting unit 21.

If, in contrast, no second data frame is received within time interval T1 or it is determined that the received second data frame D2 does not contain the acknowledgment message (ACK), evaluation unit 23 thus informs control unit 16 of this by an interrupt (IR). This is shown in FIG. 2 by the arrow labeled "IR" from evaluation unit 23 to control unit 16. Control unit 16 thereupon exits the power-saving mode.

In an embodiment, transmitting/receiving unit 15 assumes the functionalities specified at the MAC level of the automatic retransmission of data frames when there is no acknowledgment message. For this purpose, controller 20 has, for example, a RAM memory 24 configured as FIFO (first in, first out), in which the first data frame D1 is stored in the first transmission attempt, e.g., by evaluation unit 23. Instead of directly generating an interrupt, as described above, in the absence of an acknowledgment message (ACK), controller 20 (more precisely: evaluation unit 23) in this embodiment autonomously, i.e., without interaction with or instruction by control unit 16, prompts transmitting unit 21 to read data frame D1 out of memory 24 and to retransmit it, if no second data frame is received within the predefined time interval T1 or if it is determined that the received second data frame D2 does not contain the acknowledgment message. If there is no acknowledgment message after the retransmission, the steps of the retransmission of D1 and the checking whether an acknowledgment message was received are accordingly repeated. In FIG. 2, the steps of the retransmission of D1 from memory 24 is indicated by the arrow between evaluation unit 23, on the one hand, and transmitting unit 21 or memory 24, on the other. The process of the autonomous retransmission of a data frame by transmitting/receiving unit 15 is also called "auto-retry."

Only when after a predefined number N of autonomous prompts to retransmit D1, no second data frame D2, which contains the acknowledgment message, was received within the predefined time interval T1 after the specific retransmission, does evaluation unit 23 inform control unit 16 by an interrupt. The number N of the maximum performed retransmissions is preferably a value from one to five. Typically, D1 is repeated a maximum of N=3 times and thereby is transmitted a maximum of four times.

In another embodiment, transmitting/receiving unit 15 assumes the CSMA-CA functionalities specified at the MAC level (carrier sense multiple access with collision avoidance), in that controller 20 autonomously, i.e., without interaction with control unit 16, ensures that the first data frame D1 is transmitted only when the transmission channel specified for this is free. To this end, evaluation unit 23 before the first transmission, in the case of the above-described "auto-retry" procedure also before each retransmission of D1, instructs receiving unit 22, by a CCA process (clear channel assessment) specified in the standard, to check whether the transmission channel specified for the transmission of D1 is busy. Receiving unit 22 then performs the CCA procedure and reports the result of the check to evaluation unit 23. Only when this check has shown that the specified transmission channel is not busy, therefore free, does evaluation unit 23 instruct transmitting unit 21 to transmit data frame D1 to second transmitting/receiving device 12.

If the specified transmission channel is busy, in contrast, at a later time evaluation unit 23 again instructs receiving unit 22 to perform the CCA procedure. If this repeated check shows that the channel is free, evaluation unit 23 instructs transmitting unit 21 to transmit data frame D1. Otherwise, the channel occupation check is repeated at a later time. If a total of M checks have each shown that the channel is busy, evaluation unit 23 informs control unit 16 of this by an interrupt. Preferably, M has a value of three to seven, typically M=5.

The CSMA-CA/CCA functionality is shown in FIG. 2 by the dashed arrow between evaluation unit 23, on the one hand, and receiving unit 22, transmitting unit 21, and control unit 16 ("IR"), on the other.

Because transmitting/receiving unit 15 assumes the CSMA-CA functionalities, control unit 16 must neither instruct receiving unit 22 to perform CCA procedures according to a CSMA-CA algorithm nor evaluate its results. As a result, control unit 16 can shift earlier to the power-saving mode.

In another embodiment, transmitting/receiving unit 15 assumes the functionalities specified at the MAC level of the evaluation of data frames to be transmitted. Evaluation unit 23 of controller 20 in this embodiment evaluates the data frame D1 to be transmitted and checks, e.g., based on a specific data field of D1, whether in the case of its successful receipt by second transmitting/receiving device 12, 13 an acknowledgment message (ACK) is even expected. Only in this case is the second data frame D2 evaluated as described above, checked for the presence of the acknowledgment message (ACK), and not relayed to control unit 16, if it is determined that the second data frame D2 contains the acknowledgment message. The previously described auto-retry procedure and the also above-described interrupt generation in the absence of an acknowledgment message after the first or repeated transmission in this exemplary embodiment are performed only when the acknowledgment message is expected.

In FIGS. 3*a-d* there is shown four communication processes between the first (transmitting/receiving) device 11 and the second (transmitting/receiving) device 12 and the power consumption associated thereby by the first device 11. The individual communications between control unit 16 and transmitting/receiving unit 15 of the first device 11 and between transmitting/receiving unit 15 of the first device 11 and the second device 12 are hereby symbolized by arrows below each of the involved units, whereby the time course of the communication is shown from top to bottom. For each communication process, the current I required by the first device 11 is plotted over the time t from top to bottom on the left in the subfigures. The current consumption of control unit 16 is hereby shown shaded, whereas that of transmitting/receiving unit 15 is not shaded.

Figure 3A:
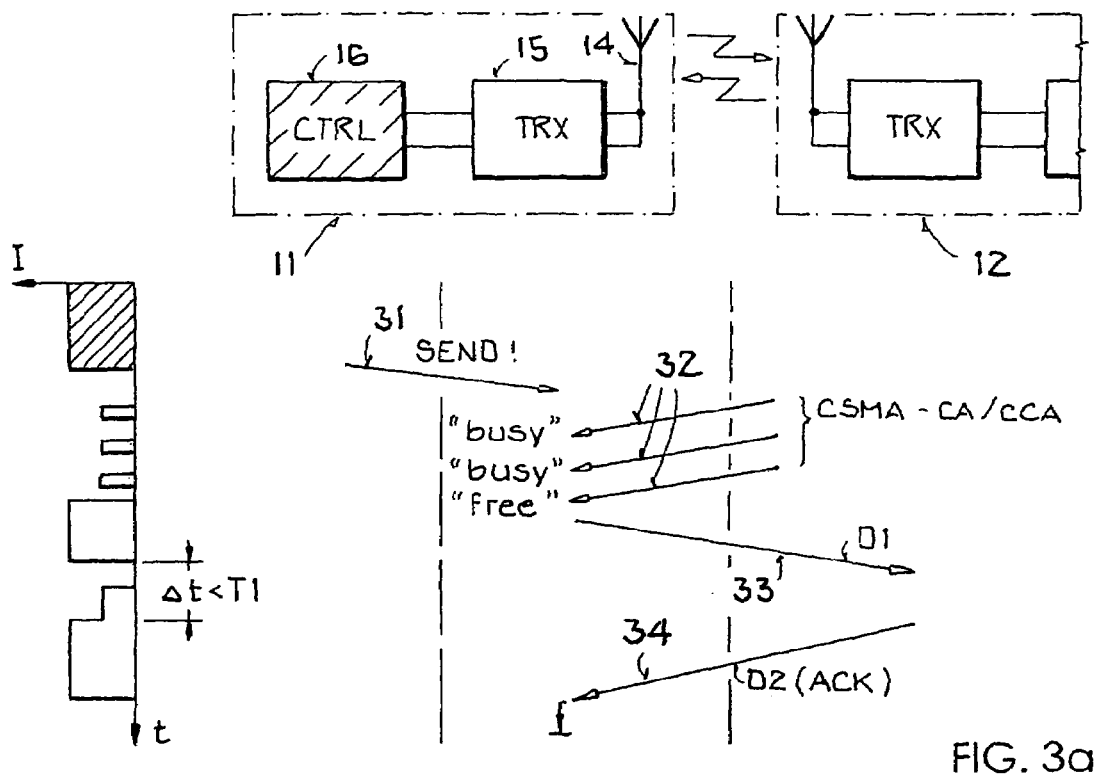
FIG. 3*a-d* are schematic drawings of a communication processes and current consumption over time according to an embodiment of the present invention.

In FIG. 3*a*, a first communication process is shown in which the first device 11 transmits a first data frame D1 to the second device 12 and then receives a second data frame D2 with an acknowledgment message for the successful receipt of D1 from the second device 12.

First, control unit 16 sends a transmit command and/or the first data frame D1 to transmitting/receiving unit 15. This is shown in FIG. 3*a* by arrow 31. After this, control unit 16 shifts from an active operating state with a relatively high power consumption to a power-saving mode with a low power consumption, as is evident from the control unit current consumption shown shaded on the left in FIG. 3*a*. As soon as command 31 is issued, the current consumption of control unit 16 drops to a negligible value, e.g., to $\frac{1}{1000}$ of the previous value.

Next, transmitting/receiving unit 15 checks whether the transmission channel is busy by means of a CSMA-CA/CCA procedure in up to M=5 attempts. This is evident in FIG. 3*a* from arrow 32 and on the left from the current pulses assignable to transmitting/receiving unit 15, whereby it is assured in this example that the first two checks lead to the identification of a busy channel ("busy"), whereas the third check shows a free channel ("free"). After the third channel occupation check 32, transmitting/receiving unit 15 of first device 11 therefore transmits the first data frame D1 to second device 12 (see arrow 33). During the transmission, there is a temporarily increased power consumption in transmitting/receiving unit 15, as is evident from the current consumption shown to the left of arrow 33. A timer is started causally related to this transmission process.

After the transmission of D1, transmitting/receiving unit 15 within the scope of a "listen mode" listens whether the data frames can be received. This is shown by a prepulse on the left in FIG. 3*a*, which has a current consumption on the order of the CSMA-CA/CCA pulse. After a time interval Δt has elapsed since the transmission of D1, which in this example is shorter than the predefined time interval T1, transmitting/receiving unit 15 receives a second data frame D2 from second device 12 according to arrow 34 and checks this frame to determine whether it contains an acknowledgment message (ACK) for the successful receipt of D1 by second device 12. During this check, the current consumption of transmitting/receiving unit 15 is considerably increased. If the check indicates that D2 contains the acknowledgment message (ACK), as assumed in FIG. 3*a*, transmitting/receiving unit 15 suppresses the relay of D2 to control unit 16. Control unit 16 can therefore remain in the power-saving mode during the entire communication process after issuing the transmission command 31.

As is evident from the left part of FIG. 3*a*, during this communication process there is no time at which both transmitting/receiving unit 15 and control unit 16 simultaneously have an increased current demand. The peak current required for the operation of device 11 therefore corresponds substantially to the maximum current of control unit 16 or that of transmitting/receiving unit 15 and hereby is clearly lower than the sum of these two maximum currents. For the sake of completeness, it is pointed out that transmitting/receiving unit 15 during inactive time intervals also has a certain (minimum) power requirement, which is negligibly small, however, and therefore not shown in FIG. 3.

Figure 3B:
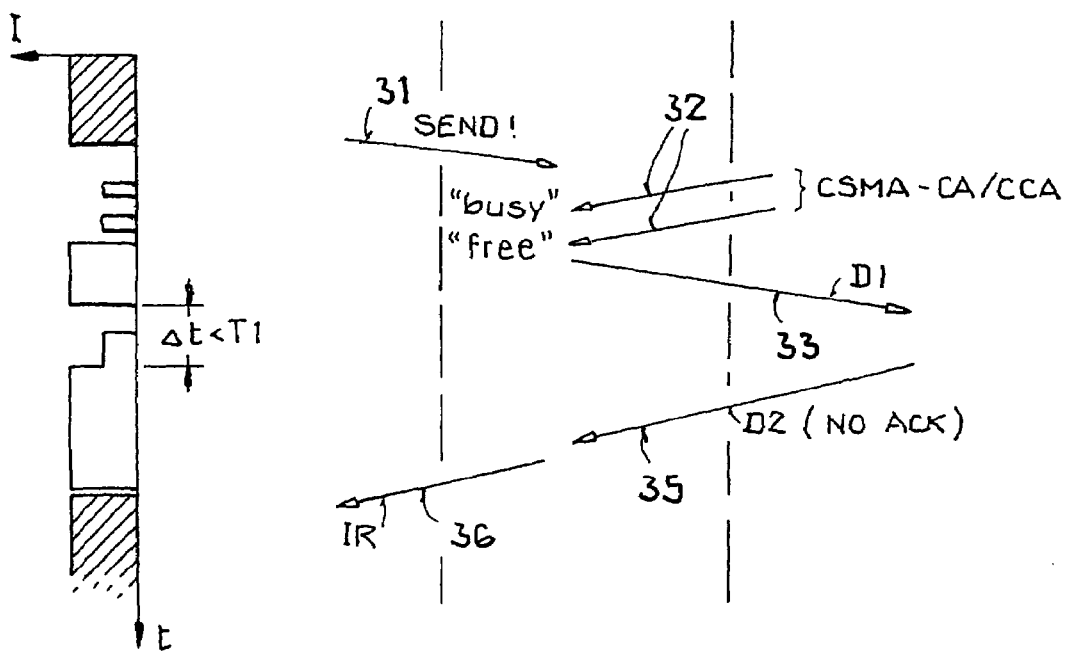

In FIG. 3*b*, a second communication process is shown, in which transmitting/receiving unit 15 after transmission of D1 receives no second data frame D2 with an acknowledgment message from second device 12.

Until transmission of first data frame D1, the second communication process corresponds to the previously described first process, so that until the start of the timer both arrows 31-33 and the current consumption in FIGS. 3*a* and 3*b* largely coincide. In contrast to FIG. 3*a*, it is assumed in FIG. 3*b* that even the second check of the channel occupation shows a free channel, which is evident from the two arrows 32 and the two associated current pulses.

After a time interval Δt has elapsed, which in this example is again shorter than the predefined time interval T1, transmitting/receiving unit 15 receives a second data frame D2 from second device 12 according to arrow 35 and checks this frame for the presence of an acknowledgment message (ACK). In contrast to the first communication process, this is not the case here ("NO ACK"), which is why transmitting/receiving unit 15 informs control unit 16 by an interrupt (IR) shown by arrow 36. Before receipt of D2 and checking for an acknowledgment message until the transmission of the interrupt, transmitting/receiving unit 15 has an increased current requirement, which declines to a negligible value after issuing of the interrupt.

Because of the interrupt 36, control unit 16 exits the power-saving mode and enters an active operating state. During the following period, control unit 16 has an increased current requirement to respond appropriately to the lack of an acknowledgment message. In this way, the control unit can notify, for example, higher layers of the communication standard of this circumstance, to cause a retransmission of D1, etc.

In the case of the second communication process as well, transmitting/receiving unit 15 and control unit 16 have an increased current requirement always only in non-overlapping time intervals, so that the peak current required for the operation of device 11 corresponds substantially to the maximum current of control unit 16 or to that of transmitting/receiving unit 15.

In the case, which is not shown in FIG. 3*b*, in which the timer runs until the predefined time interval T1 has been reached, without a second data frame D2 being received, transmitting/receiving unit 15 also informs control unit 16 by an interrupt 36. In this case, relations substantially comparable to FIG. 3*b* result, so that the above statements also apply to the required peak current.

If after M=5 time-shifted checks of channel occupation, no free channel can be determined, transmitting/receiving unit 15 informs control unit 16 of this circumstance preferably by an interrupt. In this case as well, the current requirement of transmitting/receiving unit 15 declines with the issuing of the interrupt, whereas that of control unit 16 increases during further measures. The above statements on the peak current required by device 11 apply in this case as well.

Figure 3C:
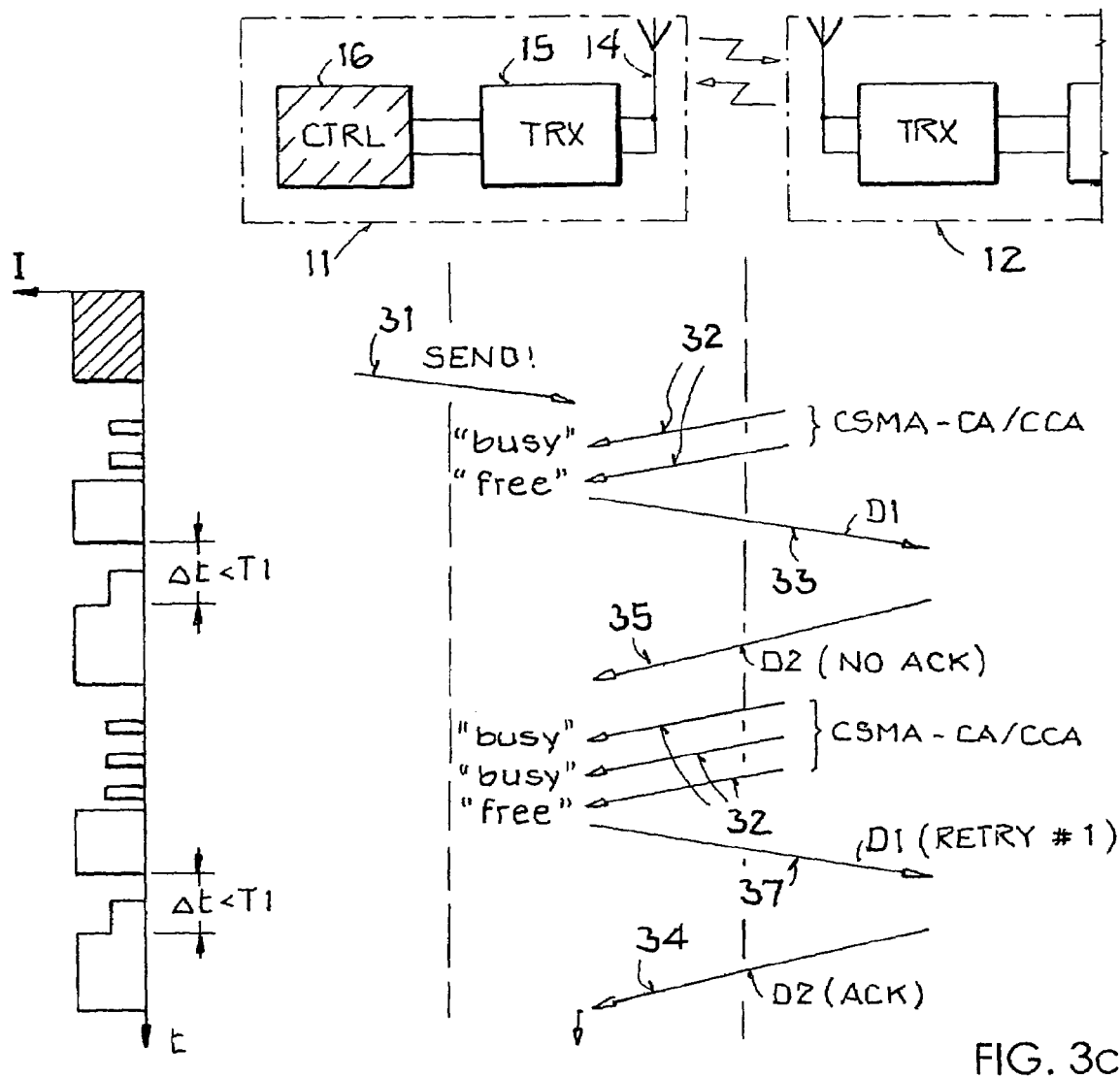

In FIG. 3c, a third communication process is shown, in which transmitting/receiving unit 15 performs the auto-retry procedure autonomously when an acknowledgment message is initially not received and the first retransmission of D1 proceeds successfully.

Until the receipt of the second data frame D2 with no acknowledgment message (NO ACK), the third communication process corresponds to the previously described second process, so that until the first receipt of D2, arrows 31-33, 35 and current I in FIGS. 3b and 3c coincide.

Instead of generating an interrupt, transmitting/receiving unit 15 performs the auto-retry process during the third communication process according to FIG. 3c. Before the retransmission of D1, transmitting/receiving unit 15 again checks the channel occupation. After two checks have determined a busy channel in the case of FIG. 3c, a free channel is detected in the third check (see the lower three arrows 32 in FIG. 3c). Shortly thereafter, transmitting/receiving unit 15 again transmits the first data frame D1 to second device 12, as is evident from arrow 37 ("Retry #1"), and the timer starts again.

After a time interval Δt has elapsed, which in this example is shorter than the predefined time interval T1, transmitting/receiving unit 15 receives a second data frame D2 from second device 12 according to arrow 34 and checks this frame for the presence of an acknowledgment message (ACK). This is similar here to the first communication process (FIG. 3a), which is why transmitting/receiving unit 15 does not relay the second data frame D2 to control unit 16 and this unit remains in the power-saving mode.

Because control unit 16 here also, after issuing the initial transmit command 31, remains generally in the power-saving mode, the times during which control unit 16 and transmitting/receiving unit 15 have an increased power consumption do not overlap, so that a lower peak current requirement for device 11 results.

Figure 3D:
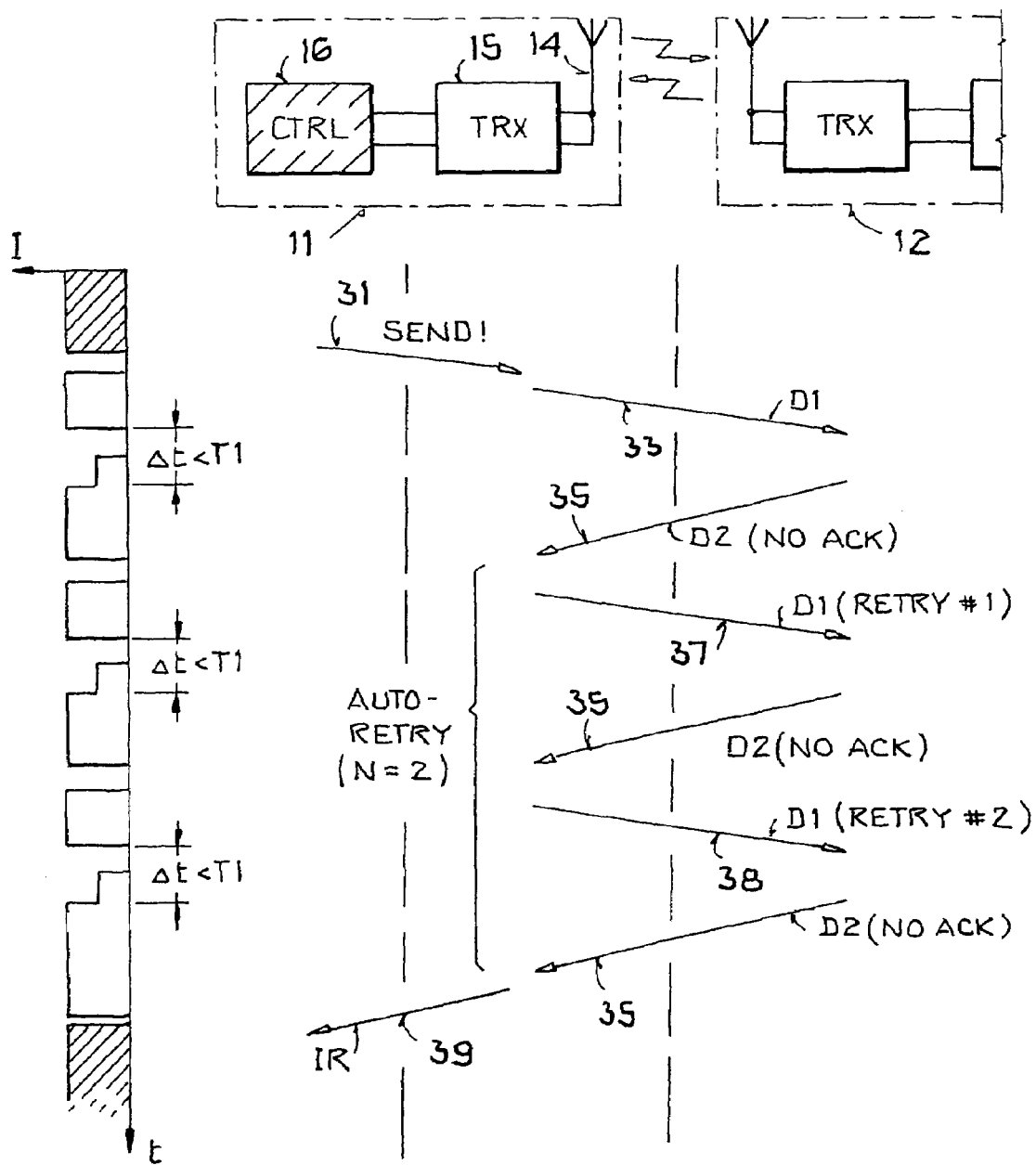

In FIG. 3d, a fourth communication process is shown, in which transmitting/receiving unit 15 performs the auto-retry procedure autonomously when an acknowledgment message is initially not received with a maximum of N=2 retransmissions and the second retransmission is also unsuccessful.

Until the first retransmission ("Retry #1" 37), relations unchanged in comparison with FIG. 3c result. For reasons of clarity, however, the CSMA-CA/CCA process, to be carried out preferably before each transmission of D1, to check channel occupation is not shown in FIG. 3d (arrow 32 in FIGS. 3a-c).

As a response to the first retransmission 37, transmitting/receiving unit 15 receives another second data frame D2, which also contains no acknowledgment message (NO ACK, middle arrow 35 in FIG. 3d), from second device 12 within the predefined time interval T1 after the first retransmission 37. After this fact is determined, transmitting/receiving unit 15 repeats the transmission process for D1 a second time ("Retry #2" 38). This again refers to another second data frame D2 without an acknowledgment message (NO ACK) within time interval T1, as is evident from the lower arrow 35. Because the maximum number of retransmissions has been reached (N=2), transmitting/receiving unit 15 now generates an interrupt and informs control unit 16 about the transmission efforts which are also unsuccessful after two retries (see arrow 39). Control unit 16 then exits the power-saving mode and informs, for example, higher layers of the communication standard of the failed transmission attempts.

In the case of the fourth communication process as well, the time intervals of increased power requirement of transmitting/receiving unit 15 do not overlap with those of control unit 16, so that in all of the discussed cases the peak current requirement of first device 11 coincides substantially with the maximum current of transmitting/receiving unit 15 or that of control unit 16 and thereby is clearly below the sum of these two maximum currents.

Although the present invention was described above with reference to example embodiments, it is not limited thereto but can be modified in many ways. Thus, the invention is not limited, for example, either to WPANs per se, or to WPANs according to IEEE 802.15.4 or to the bandwidth, modulation, and multiplex access methods, frequency bands, bit, symbol, and chip rates and increments, specified there, or to the provided values for the intermediate frequency, the sampling frequency, filter bandwidths, types, and sequences, etc. Rather, the invention can be used advantageously in highly diverse wireless or hard-wired digital communication systems.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for transmitting and receiving, the device comprising:
    an antenna;
    a transmitting/receiving unit for transmitting and receiving data according to a communication standard, the transmitting/receiving unit including a transmission unit connected to the antenna for transmitting first data frames to a second transmitting/receiving device, the transmitting/receiving unit including a receiving unit connected to the antenna for receiving second data frames from the second transmitting/receiving device; and
    a control unit connected to the transmitting/receiving unit for controlling the transmitting/receiving unit, the control unit being configured to instruct the transmitting/receiving unit to transmit a first data frame and to receive a second data frame from the transmitting/receiving unit;
    wherein the transmitting/receiving unit has a controller, which is connected to the receiving unit and the control unit, and evaluates a second data frame received by the receiving unit within a predefined time interval after transmission of the first data frame and determines whether the second data frame contains an acknowledgment message for a successful receipt of the first data frame by the second transmitting/receiving device and to relay the second data frame to the control unit only if it is determined that it does not contain the acknowledgment message in order to reduce power requirements of said control unit when said second data frame contains an acknowledgement message.

2. The device according to claim 1, wherein the control unit has at least two operating modes with a different high power consumption and shifts to a power-saving mode with a low power consumption when the control unit instructs the transmitting/receiving unit to transmit the first data frame.

3. The device according to claim 2, wherein the control unit exits the power-saving mode when it receives an interrupt from the controller.

4. The device according to claim 1, wherein the controller, before the transmission of the first data frame, instructs the receiving unit to check whether the transmission channel specified for the transmission of the first data frame is busy and instructs the transmission unit to transmit the first data frame only when the check has shown that the specified transmission channel is not busy.

5. The device according to claim 1, wherein the controller informs the control unit, via an interrupt, if no second data frame is received within a predefined time interval or that the second data frame does not contain the acknowledgment message.

6. The device according to claim 1, wherein the controller is connected to the transmission unit and includes a memory, wherein the controller stores the first data frame in the memory, and without instruction by the control unit prompts the transmission unit to retransmit the first data frame to the second transmitting/receiving device if no second data frame is received within the predefined time interval or that the second data frame does not contain the acknowledgment message.

7. The device according to claim 6, wherein the controller informs the control unit, via an interrupt, only when, after a predefined number of prompts, not given by the control unit to retransmit the first data frame to the second transmitting/receiving device, no second data frame, which contains the acknowledgment message, was received within the predefined time after the specific retransmission.

8. The device according to claim 1, wherein the controller evaluates the first data frame and determines whether, in the case of a successful receipt by the second transmitting/receiving device, the acknowledgment message is expected, wherein, if the acknowledgment message is expected, the controller evaluate the second data frame to determine whether it contains the acknowledgment message, and wherein the controller does not relay the second data frame to the control unit if the acknowledgment message is expected and if it is determined that the second data frame contains the acknowledgment message.

9. The device according to claim 8, wherein the controller informs the control unit, via an interrupt, if the acknowledgment message is expected and if no second data frame is received within the predefined time interval or if it is determined that the second data frame does not contain the acknowledgment message.

10. The device according to claim 8, wherein the controller is connected to the transmitting unit and has a memory, wherein the controller stores the first data frame in the memory and, without instruction by the control unit, prompts the transmission unit to retransmit the first data frame to the second transmitting/receiving device if the acknowledgment message is expected, and if no second data frame is received within a predefined time interval or if it is determined that the second data frame does not contain the acknowledgment message.

11. The device according to claim 10, wherein the controller informs the control unit, via an interrupt, only when the acknowledgment message is expected and when, after a predefined number of prompts not given by the control unit, to retransmit the first data frame to the second transmitting/receiving device when no second data frame, which contains the acknowledgment message, was received within the predefined time after the specific retransmission.

12. The device according to claim 7, wherein the predefined number of prompts to retransmit the first data frame to the second transmitting/receiving device has a value in a range of one to five.

13. The device according to claim 6, wherein the controller, before the retransmission of the first data frame, instructs the receiving unit to check whether the transmission channel specified for the retransmission of the first data frame is busy, and instructs the transmission unit to retransmit the first data frame only when the check has shown that the specified transmission channel is not busy.

14. The device according to claim 4, wherein, if the check has shown that the specified transmission channel is busy, the controller instructs the receiving unit at a later time to check whether the specified transmission channel is busy, wherein the controller instructs the transmission unit to transmit the first data frame only when the repeated check has shown that the specified transmission channel is not busy, and wherein the controller informs the control unit, via an interrupt, only when a predefined number of checks each have shown that the specified transmission channel is busy.

15. The device according to claim 14, wherein the predefined number of checks has a value in the range of three to seven.

16. The device according to claim 1, wherein the predefined time interval has a duration between 150 µs and 500 µs or between 300 µs and 400 µs.

17. The device according to claim 1, wherein the transmitting/receiving unit performs the functionalities of a physical layer and a portion first functionalities of a MAC layer of the communication standard and wherein the control unit performs only the remaining second functionalities of the MAC layer and optionally the functionalities of higher layers.

18. The device according to claim 1, wherein the transmitting/receiving unit is an ASIC or ASSP and/or the control unit is a microcontroller.

19. The device according to claim 1, wherein the transmitting/receiving unit and the control unit are a single integrated circuit.

20. The device according to claim 1, wherein the device transmits and receives according to IEEE Standard 802.15.4.

* * * * *